US009797097B2

(12) United States Patent
Kugel et al.

(10) Patent No.: US 9,797,097 B2
(45) Date of Patent: Oct. 24, 2017

(54) PAVEMENT MARKING COMPOSITIONS

(71) Applicant: 3M INNOVATIVE PROPERTIES COMPANY, St. Paul, MN (US)

(72) Inventors: Alexander J. Kugel, Woodbury, MN (US); Craig A. Kapfer, Maplewood, MN (US); Cori S. Apel, Woodbury, MN (US); Clinton L. Jones, Somerset, WI (US); Ryan B. Prince, Saint Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/404,300

(22) PCT Filed: Sep. 28, 2012

(86) PCT No.: PCT/US2012/057936
§ 371 (c)(1),
(2) Date: Nov. 26, 2014

(87) PCT Pub. No.: WO2013/180740
PCT Pub. Date: Dec. 5, 2013

(65) Prior Publication Data
US 2015/0167263 A1 Jun. 18, 2015

Related U.S. Application Data

(60) Provisional application No. 61/652,730, filed on May 29, 2012.

(51) Int. Cl.
C09D 5/00 (2006.01)
E01C 11/00 (2006.01)
C09D 175/02 (2006.01)
C08G 18/79 (2006.01)
C08G 18/32 (2006.01)
E01C 5/20 (2006.01)
C08K 5/00 (2006.01)
E01F 9/506 (2016.01)
E01F 9/512 (2016.01)
C08K 3/22 (2006.01)

(52) U.S. Cl.
CPC .......... *E01C 11/00* (2013.01); *C08G 18/3228* (2013.01); *C08G 18/3234* (2013.01); *C08G 18/792* (2013.01); *C08K 5/0016* (2013.01); *C09D 175/02* (2013.01); *E01C 5/20* (2013.01); *E01F 9/506* (2016.02); *E01F 9/512* (2016.02); *C08K 2003/2241* (2013.01)

(58) Field of Classification Search
CPC .............. C09D 5/004; C09D 175/02
USPC ....................................... 523/172
See application file for complete search history.

(56) References Cited

U.S. PATENT DOCUMENTS

| 3,043,196 | A | 7/1962 | Palmquist |
| 3,175,935 | A | 3/1965 | Vanstrum |
| 3,252,376 | A | 5/1966 | De Vries |
| 3,254,563 | A | 6/1966 | De Vries |
| 3,274,888 | A | 9/1966 | Vanstrum |
| 3,486,952 | A | 12/1969 | Vanstrum |
| 3,556,637 | A | 1/1971 | Palmquist |
| 4,072,403 | A | 2/1978 | Eigenmann |
| 4,564,556 | A | 1/1986 | Lange |
| 4,652,172 | A | 3/1987 | Eigenmann |
| 4,983,458 | A | 1/1991 | Dejaiffe |
| 5,268,789 | A | 12/1993 | Bradshaw |
| 5,312,886 | A | 5/1994 | House |
| 5,616,677 | A | 4/1997 | Primeaux, III et al. |
| 5,688,892 | A | 11/1997 | Ishii et al. |
| 5,774,265 | A | 6/1998 | Mathers |
| 6,027,764 | A | 2/2000 | Gurney |
| 6,461,988 | B2 | 10/2002 | Budd |
| 6,521,718 | B2 * | 2/2003 | Goeb ............... C08G 18/3821 427/137 |
| 7,001,948 | B2 | 2/2006 | Gupta et al. |
| RE40,088 | E | 2/2008 | Purgett |
| 7,342,056 | B2 | 3/2008 | Patel |
| 7,753,616 | B2 | 7/2010 | Greer et al. |
| 2003/0051807 | A1 | 3/2003 | Yamaguchi |
| 2004/0176522 | A1 * | 9/2004 | Schaetzle ............ C09J 201/10 524/495 |
| 2006/0211840 | A1 | 9/2006 | Lee |
| 2007/0208156 | A1 | 9/2007 | Posey |
| 2008/0057317 | A1 | 3/2008 | Kettner |
| 2011/0076485 | A1 | 3/2011 | Yakulis |
| 2012/0252971 | A1 * | 10/2012 | Schreiber ............ C08G 18/10 524/775 |

FOREIGN PATENT DOCUMENTS

| EP | 0322671 | 7/1989 |
| JP | H07188583 | 7/1995 |
| KR | 2007-0020328 | 2/2007 |

(Continued)

OTHER PUBLICATIONS

International Search report for PCT International Application No. PCT/US2012/057936, mailed on Feb. 28, 2013, 5 pages.
Huang, Weibo, "Spray Polyurea Elastomer Technology", Chemical Industry Press of China, Jul. 2005, pp. 102-104.
Liu, Dengliang, "Coating Technology" Chemical Press of China, Jan. 2010, p. 1729.
Huang, Weibo, et al. "Spray Polyurea Elastomer Technology", Chemical Industry Press of China, Jul. 2005, p. 97.

*Primary Examiner* — Edward Cain
(74) *Attorney, Agent, or Firm* — Trisha D. Adamson

(57) ABSTRACT

A pavement marking composition comprises an isocyanate-containing component and an amine-containing component. At least one of the components comprises plasticizer and at least one of the components comprises filler. The composition comprises about 5 wt. % or more plasticizer and is substantially free of polyaspartic ester amines.

19 Claims, No Drawings

(56) References Cited

FOREIGN PATENT DOCUMENTS

| WO | WO 97-03814 | 2/1997 |
| WO | WO 97-28471 | 8/1997 |
| WO | WO 98/56842 A1 | 12/1998 |
| WO | WO 99/20701 A1 | 4/1999 |
| WO | WO 2010-101560 | 9/2010 |
| WO | WO 2010-120617 | 10/2010 |
| WO | WO 2011-084602 | 7/2011 |
| WO | WO 2012-161774 | 11/2012 |

* cited by examiner

PAVEMENT MARKING COMPOSITIONS

CROSS REFERENCE TO RELATED APPLICATIONS

This application is a national stage filing under 35 U.S.C. 371 of PCT/US2012/057936, filed Sep. 28, 2012, which claims priority to Provisional Application No. 61/652,730, filed May 29, 2012, the disclosure of which are incorporated by reference in their entirety herein.

FIELD

This invention relates to pavement marking compositions.

BACKGROUND

Pavement markings (e.g., paints, tapes, and individually mounted articles) guide and direct motorists and pedestrians traveling along roadways and paths. Paint was a preferred pavement marking for many years. However, modern liquid pavement marking materials offer significant advantages over paint, such as increased visibility, retroreflectance, improved durability, and temporary and/or removable marking options.

For example, pavement markers made with liquid pavement marking materials may include reflective optical elements adhered to the pavement surface. Liquid pavement markings can use glass microspheres for retroreflection. The microspheres can be flood coated onto the wet liquid pavement marking material after coating. This provides the liquid pavement marking material with improved retroreflectivity and also covers the top surface of the uncured or undried coating with a protective layer of microspheres. This protective layer can allow the markings to be exposed to traffic sooner because of the layer of microspheres over the surface, which prevents transfer of the coating to the surface of vehicle tires. The time between application and the point where material will no longer transfer to vehicle tires is defined as the "track-free" time. Shorter track-free times increase marking efficiency by reducing or eliminating the need for traffic disruption through such measures as closing lanes or placing traffic control devices to protect such markings.

SUMMARY

Pavement markings are subject to continuous wear and exposure to the elements as well as road chemicals. Consequently, there is a need for pavement marking compositions and pavement markers that provide durability and retained reflectivity once applied to a surface and dried, hardened and/or cured.

The inventors of the present invention have also recognized that there is a need for liquid pavement marking compositions with improved cure profiles to ensure both substrate wet out and rapid track-free time.

Some existing pavement marking compositions include a 1:3 NCO:NH volume ratio composition. These compositions typically include polyaspartic ester amines, and although they have excellent durability and whiteness, the compositions can suffer from substantial shrinkage, preventing these compositions from being applied to asphalt surfaces in longline applications. In addition, these compositions cannot be applied with plural component spray equipment that is used to apply 1:2 or 2:1 NCO:NH volume ratio coatings, which is the equipment many pavement marking applicators have on hand.

Other existing pavement marking compositions include a 1:2 NCO:NH volume ratio composition. These compositions are typically applied to the roadway using standard spray equipment that also is used to apply 2:1 epoxy:NH coatings to roadways. These compositions also often include polyaspartic ester amines and suffer from substantial shrinkage. Other 1:2 NCO:NH volume ratio compositions couple polyurea chemistry and light-cured acrylate chemistry into a single product in order to address shrinkage issues. These compositions, however, can suffer from limitations for longline applications and can thus require modification of standard curing/application equipment.

The compositions of the present invention resolve the drawbacks associated with the currently available products. Briefly, the present invention relates to pavement marking composition comprising an isocyanate-containing component and an amine-containing component. At least one of the components comprises plasticizer and at least one of the components comprises filler. The composition comprises about 5 wt. % or more plasticizer and is substantially free of polyaspartic ester amines.

The pavement marking compositions of the invention address the issues of the prior art. The compositions are substantially free of polyaspartic ester amines and as such do not experience undesirable shrinkage. As used herein, "substantially free of polyaspartic ester amines" means that while the compositions may comprise small amounts of polyaspartic ester amines, they are present in small quantities such that they do not substantially negatively affect shrinkage (i.e., the shrinkage of a pavement marking including the pavement marking composition is less than about 1.5% or less than about 1%). In some embodiments, the compositions are free of polyaspartic ester amines. Because the compositions of the invention do not suffer from the shrinkage issues associated with pavement marking compositions of the prior art, they can be applied to concrete or asphalt in longline applications.

Furthermore, the compositions have a controlled cure speed. The compositions of the invention have a surprising cure profile in that the surface appears to cure much more rapidly than the bulk. This "skinning" effect allows substantially rapid track-free times with slower through-cure times, which allows wetting of the substrate to occur. At the same time, the pavement marking compositions of the invention maintain important physical properties such as, for example, durability and retained reflectivity once applied to a surface and dried or cured.

The pavement marking compositions of the present can be formulated at various NCO:NH volume ratios. In some embodiments, the pavement marking compositions have a 1:2 NCO:NH volume ratio and are thus capable of use with standard application equipment used to apply 1:2 or 2:1 NCO:NH volume ratio coatings. Additionally, the pavement marking compositions of the present application do not require the use of any special light curing equipment and can be pigmented white or yellow, as desired.

DETAILED DESCRIPTION

The pavement marking compositions of the invention comprise an isocyanate-containing component and an amine-containing component. The compositions can be formulated at various NCO:NH ratios. In some embodiments, the volume ratio of the isocyanate-containing component to the amine-containing component is 1:X, wherein is about 0.1, 0.2 or 0.3 to about 1, 2, 3 or 10. In some embodiments the volume ratio of the isocyanate-containing component to the amine-containing component is about 1:2 or 2:1.

In some embodiments, when the isocyanate-containing component is combined with the amine-containing component, a polyurea resin is formed. The polyurea resin is a thermoset component.

The compositions also comprise plasticizer and filler. The plasticizer and filler may be in the isocyanate-containing component, the amine-containing component or both. The inventors have discovered that when the plasticizer is present in the composition in amounts of about 5 wt. % or more, it slows down the cure rate of the compositions. Surprisingly, however, this effect is not observed unless the composition includes filler.

Amine-Containing Component

In some embodiments, the amine-containing component comprises an amine that has a viscosity that is less than 50 cSt at 38° C. In some embodiments, the amine-containing component comprises a sterically hindered amine. In some embodiments, the amine-containing component comprises polyoxyalkyleneamine.

The amine can include at least one polyamine. As used herein "polyamine" refers to compounds having at least two amine groups each containing at least one active hydrogen (N—H group) selected from primary amine or secondary amine. Polyamine also includes oligomeric or polymeric amines. The amine component can include aliphatic and/or aromatic polyamine(s). For improved weathering and diminished yellowing, the amine component is typically aliphatic. In order to obtain the preferred reaction rate, the amine component includes and may consist solely of one or more secondary amines. In many embodiments the secondary amines are sterically hindered amines. In some embodiments, the amine-containing component comprises at least one aliphatic cyclic secondary diamine. Unlike aspartic acid ester, the secondary amine substituents lack ester groups.

In one embodiment, the amine-containing component comprises one or more aliphatic cyclic secondary diamines that comprise two, optionally substituted, hexyl groups bonded by a bridging group. Each of the hexyl rings comprises a secondary amine substituent.

The aliphatic cyclic secondary diamine typically has the general structure:

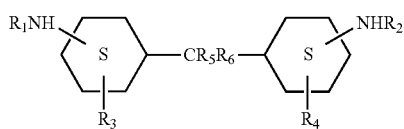

(Formula 1)

wherein $R_1$ and $R_2$ are independently linear or branched alkyl groups, having 1 to 10 carbon atoms. $R_1$ and $R_2$ are typically the same alkyl group. Representative alkyl groups include methyl, ethyl, propyl, isopropyl, butyl, isobutyl, secondary butyl, tertiary butyl, and the various isomeric pentyl, hexyl, heptyl, octyl, nonyl, and decyl groups. The symbol "S" in the center of the hexyl rings indicates that these cyclic groups are saturated. The preferred $R_1$ and $R_2$ contain at least three carbons, and the butyl group is particularly favored, such as a sec-butyl group.

$R_3$, $R_4$, $R_5$ and $R_6$ are independently hydrogen or a linear or branched alkyl group containing 1 to 5 carbon atoms. $R_3$, and $R_4$ typically the same alkyl group. In some embodiments, $R_5$ and $R_6$ are hydrogen. Further. Is some embodiments, $R_3$, and $R_4$ are methyl or hydrogen.

The substituents are represented such that the alkylamino group may be placed anywhere on the ring relative to the $CR_5R_6$ group. Further, the $R_3$ and $R_4$ substituents may occupy any position relative to the alkylamino groups. In some embodiments, the alkylamino groups are at the 4,4'-positions relative to the $CR_5R_6$ bridge. Further, the $R_3$ and $R_4$ substituents typically occupy the 3- and 3'-positions.

Commercially available aliphatic cyclic secondary diamines having this structure include:

| Chemical Tradename (Supplier, Location) | Name | Chemical Structure |
|---|---|---|
| "Clearlink 1000" (Dorf Ketal Chemicals LLC, Stafford, TX) | Cyclohexanamine, 4,4'-methylenebis(N-(1-methylpropyl)- | |
| "Clearlink 3000" (Dorf Ketal Chemicals LLC) | 3,3'-dimethylcyclohexanamine, 4,4'-methylenebis(N-(1-methylpropyl)- | |

In another embodiment, the second part comprises one or more aliphatic cyclic secondary diamines that comprise a single hexyl ring. The aliphatic cyclic secondary diamine typically has the general structure:

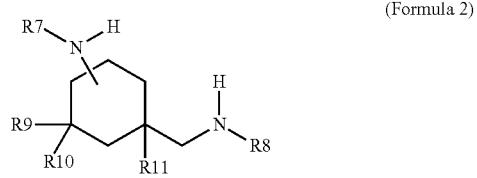

(Formula 2)

wherein $R_7$ and $R_8$ are independently linear or branched alkyl groups, having 1 to 10 carbon atoms or an alkylene group terminating with a —CN group. $R_7$ and $R_8$ are typically the same alkyl group. Representative alkyl groups include the same as those described above for $R_1$ and $R_2$. In one embodiment, $R_7$ and $R_8$ are alkyl groups having at least three carbons, such as isopropyl.

$R_9$, $R_{10}$ and $R_{11}$ are independently hydrogen or a linear or branched alkyl group having 1 to 5 carbon atoms. $R_9$, $R_{10}$ and $R_{11}$ are typically the same alkyl group. In some embodiments, $R_9$, $R_{10}$ and $R_{11}$ are methyl or hydrogen. In one embodiment $R_9$, $R_{10}$ and $R_{11}$ are isopropyl groups.

The substituents are represented such that the alkylamino group may be placed anywhere on the ring relative to the —$NR_8$ group. In some embodiments, the alkylamino group is 2 or 3 positions away from the —$NR_8$. The preferred alkylamine group is two positions away from the —$NR_8$ group on the cyclohexyl ring.

In some embodiments, the aliphatic cyclic secondary diamine is prepared by the reaction product of (1 equivalent of) isophorone diamine and (2 equivalents of) a Michael acceptor group that reduces the nucleophilicity of the resulting 2° amine groups. Representative Michael acceptors include acrylonitrile and α,β-unsaturated carbonyl compounds, with acrylonitrile typically preferred. In some embodiments, the alkylene group between the terminal—CN group and the amine group has at least two carbon atoms.

Commercially available aliphatic cyclic secondary diamines having this structure include:

| Chemical Tradename (Supplier, Location) | Chemical Structure |
|---|---|
| HXA CE 425 (Hanson Group LLC., Alpharetta, GA) | [structure showing isophorone diamine reacted with acrylonitrile, with NC-CH2-CH2-NH- and -CH2-NH-CH2-CH2-CN groups on cyclohexyl ring] |
| Jefflink 754 (Huntsman, The Woodlands, TX) | [structure showing isophorone diamine with isopropyl-NH- groups on cyclohexyl ring] |

In some embodiments, one or more aliphatic cyclic secondary diamine(s) are the sole isocyanate-reactive component(s). The isocyanate-reactive component of the amine-containing component may include a single species according to Formula 1, a single species according to Formula 2, a combination of a species of Formula 1 with Formula 2, as well as various other combinations. The amine-containing component typically comprises at least 20 wt. % or 25 wt. % of aliphatic cyclic secondary diamine. In some embodiments, the second part may comprise no greater than 30 wt. %, 35 wt. %, 40 wt. % or 45 wt. % of aliphatic cyclic secondary diamine.

In other embodiments, the aliphatic cyclic secondary diamine is combined with one or more secondary aliphatic polyamine (including other cycloaliphatic polyamines) having a different structure than Formulas 1 and 2. The other secondary aliphatic polyamine may include aspartic acid esters, such as described in WO 2010/120617. Further, the other secondary aliphatic polyamine may include an acyclic aliphatic linear or branched polyamines (i.e. that lacks a cyclic group). In this embodiment, the second part may comprise up to about 75 wt. % of such other secondary aliphatic polyamines.

Commercially available aliphatic acyclic secondary diamines include the following:

| Chemical Tradename (Supplier, Location) | Chemical Structure |
|---|---|
| "Ethacure 90" Albemarle Corporation (Baton Rouge, LA) | [structure showing t-butyl-N-CH2(CH2)4CH2-N-t-butyl diamine] |
| "Jeffamine SD-231" and "Jeffamine SD-401" Huntsman, The Woodlands, TX | [structure: iPr-NH-CH(CH3)-CH2-(O-CH2-CH(CH3))x-NH-iPr] wherein x average about 2.5 to about 6, and Mw = ranges from 300 g/mole to 600 g/mole |

In some embodiments, the other aliphatic secondary diamine components are utilized at a lower concentration as to not detract from the beneficial properties provided by the aliphatic cyclic secondary diamine (e.g. of Formula 1 and/or 2). Hence, when present the concentration is typically no greater than 40 wt. % or 30 wt. % of the amine-containing component.

When present the optional other amine components are chosen to dissolve in the liquid aliphatic cyclic secondary diamine (e.g. of Formula 1 and/or 2).

In some embodiments, CLEARLINK 1000 and/or JEF-FLINK 754 are preferred amines.

In some embodiments one or more amine-functional coreactants can be utilized. These amines (other than aspartic ester amines) can function as chain extenders and/or impact modifiers. The use of such amine-functional coreactant(s) can contribute to the presence of soft segments in the polymer backbone for improved toughness properties. Such amine-functional coreactants can be primary amines, secondary amines, or combinations thereof.

Isocyanate-Containing Component

In some embodiments, the isocyanate-containing component comprises one or more of isocyanurate groups, uretdione groups, biuret groups, and allophonate groups. In some embodiments, the isocyanate-containing component comprises one or more of hexamethylene diisocyanate, cyclohexane diisocyanate, 1,12-dodecane diisocyanate, 1,4-tetramethylene diisocyanate, isophorone diisocyanate, dicyclomethane diisocyanate, m-phenylene diisocyanate, p-phenylene diisocyanate, polymethylene polyphenylisocyanate, tetraalkyl xylene diisocyanate, toluene diisocyanate, dianisidine diisocyanate, bitolylene diisocyanate, naphthalene-1,4-diisocyanate, diphenylene 4,4'-diisocyanate, xylylene-1,3-diisocyanate, bis(4-isocyanatophenyl)methane, bis(3-methyl-4-isocyanatophenyl)methane, 4,4'-diphenylpropane diisocyanate, and mixtures thereof, polymeric forms thereof, and an active hydrogen containing material selected from at least one polyol, a high molecular weight polyoxyalkyleneamine or a combination thereof.

In some embodiments, the isocyanate-containing component comprises a polyisocyanate. "Polyisocyanate" means any organic compound that has two or more reactive isocyanate (—NCO) groups in a single molecule such as diisocyanates, triisocyanates, tetraisocyanates, etc., and mixtures thereof. Polyisocyanate also includes oligomeric or polymeric isocyanates. Cyclic and/or linear polyisocyanate molecules may usefully be employed. For improved weathering and diminished yellowing, the polyisocyanate(s) of the isocyanate component is typically aliphatic. Useful aliphatic polyisocyanates include, for example, bis(4-isocyanatocyclohexyl) methane such as available from Bayer Corp., Pittsburgh, Pa. under the trade designation "Desmodur W"; isophorone diisocyanate (IPDI) such as commercially available from Huels America, Piscataway, N.J.; hexamethylene diisocyanate (HDI) such as commercially available from Aldrich Chemical Co., Milwaukee, Wis.; trimethyl hexamethylene diisocyanate such as commercially available from Degussa, Corp., Dusseldorf, Germany under the trade designation "Vestanate TMDI"; and m-tetramethylxylene diisocyanate (TMXDI) such as commercially available from Aldrich Chemical Co., Milwaukee, Wis. Although typically less preferred, aromatic isocyanates such as diphenylmethane diisocyanate (MDI) such as commercially available from Bayer Corp., Pittsburgh, Pa. under the trade designation "Mondur M"; toluene 2,4-diisocyanate (TDI) such as commercially available from Aldrich Chemical Co., Milwaukee, Wis., and 1,4-phenylene diisocyanate are also useful. In many embodiments, the polyisocyanates include derivatives of the above-listed monomeric polyisocyanates. These derivatives include, but are not limited to, polyisocyanates containing biuret groups, such as the biuret adduct of hexamethylene diisocyanate (HDI) available from Bayer Corp. under the trade designation "Desmodur N-100", polyisocyanates containing isocyanurate groups, such as that available from Bayer Corp. under trade designation "Desmodur N-3300" or Desmodur N-3900, as well as polyisocyanates containing urethane groups, uretdione groups, carbodiimide groups, allophonate groups, and the like.

Plasticizer

The amine-containing component, the isocyanate-containing component or both comprise plasticizer. Suitable plasticizers include, but are not necessarily limited to, dicarboxylic or tricarboxylic ester-based plasticizers such as dimethyl phthalate, bis(2-ethylhexyl) phthalate (DEEM), diisononyl phthalate (DINP), bis(n-butyl)phthalate (DnBP, DBP), butyl benzyl phthalate (BBzP) diisodecyl phthalate (DIDP), di-n-octyl phthalate (DOP or DnOP), di-n-nonyl phthalate, di-n-undecyl phthalate, diundecyl phthalate, di-n-hexyl phthalate, di-n-heptyl phthalate, ditridecyl phthalate, undecyldodecyl phthalate, di(2-propylheptyl phthalate), nonylundecyl phthalate, alkylbenzyl phthalate, C7-C9 butyl phthalate, texanolbenzylphthalate, polyester phthalate, diallylphthalate, n-butylphthalyl-n-butyl glycosate, dicaprylphthalate, butylcyclohexyl phthalate, dicyclohexyl phthalate or butyl octyl phthalate, diisooctyl phthalate (DIOP), diethyl phthalate (DEP), diisobutyl phthalate (DIBP), trimellitates such as trimethyl trimellitate (TMTM), trioctyl trimellitate, triisooctyl trimellitate, tri isononyl trimellitate, triisodecyl trimellitate, tri-n-hexyl trimellitate, tri-(2-ethylhexyl) trimellitate (TEHTM-MG), tri-(n-octyl, n-decyl) trimellitate (ATM), tri-(heptyl, nonyl) trimellitate (LTM), n-octyl trimellitate (OTM); adipates, sebacates, glutarates, azelates or maleates such as bis(2-ethylhexyl)adipate (DEHA), dimethyl adipate (DMAD), monomethyl adipate (MMAD), diisonyl adipate, diisooctyl adipate, diisodecyl adipate, di tridecyl adipate, dibutoxyethyl adipate, dibutoxyethoxy adipate, di(n-octyl, undecyl)adipate, polyester adipate, poly glycol adipates, dioctyl adipate (DOA), dioctyl azelate, di-2-ethylhexyl glutamate, di-2-ethyl hexyl sebacates, dibutoxyethyl sebecate, dibutyl sebacate (DBS), dibutyl maleate (DBM), diisobutyl maleate (DIBM); benzoates such as isodecyl benzoate, diethylene glycol dibenzoate, dipropylene glycol dibenzoate, triethylene glycol dibenzoate 1,4 cyclohexane dimethanol dibenzoate, 2,2,4 trimethyl-1,3 pentane diol dibenzoate, 2-ethylhexyl benzoate, C9 benzoates, C10 benzoates, texanolbenzoate, ethylene glycol dibenzoate, propylene glycol dibenzoate, triethylene glycol dibenzoate, 2,2,-dimethyl-1,3 propanediol dibenzoate, pentaerythritol tetrabenzoate, glycerol tribenzoate, polypropylene glycol dibenzoate; epoxidized vegetable oils; sulfonamides such as N-ethyl toluene sulfonamide (o/p ETSA), ortho and para isomers, N-(2-hydroxypropyl) benzene sulfonamide (HP BSA), N-(n-butyl) benzene sulfonamide (BBSA-NBBS); organophosphates such as tricresyl phosphate (TCP), triarylphosphates, tributyl phosphate (TBP); glycols or poly ethers such as triethylene glycol dihexanoate (3G6, 3GH), tetraethylene glycol diheptanoate (4G7), glycerol triacetate (triacetin); polymeric plasticizers; polybutene; or biodegradable plasticizers such as acetylated monoglycerides: alkyl citrates such as triethyl citrate (TEC), acetyl triethyl citrate (ATEC), tributyl citrate (TBC), acetyl tributyl citrate (ATBC), trioctyl citrate (TOC), acetyl trioctyl citrate (ATOC), trihexyl citrate (THC), acetyl trihexyl citrate (ATHC), butyryl trihexyl citrate (BTHC, trihexyl o-butyryl citrate), trimethyl citrate (TMC), C10-C21 alkane phenol esters or alkyl sulphonic acid phenyl ester (ASE), acetic acid reaction products with fully hardened castor oil, diisononyl cyclohexane 1,2 dicarboxylate, polymers of adipic acid/phthalates/adipates/sebecates/with glycols and often acid terminated, 2,2,4-trimethyl-1,3-pentanediol diisobutyrate, and 1,2-Cyclohexane dicarboxylic acid diisononyl ester. The aforestated plasticizers can be used alone or in combination.

Examples of useful commercially available plasticizers include, for example, MESAMOLL available from Lanxess, Pittsburgh, Pa.; RHODIASOLV IRIS available from Rhodia, Bristol, Pa.; and PRIFER 6813 available from Croda USA, Edison, N.J.

The compositions of the invention typically comprise about 5 wt. % or more, about 8 wt. % or more, or about 10 wt. % or more plasticizer. In some embodiments, the composition comprises from about 5.8 or 10 wt. % to about 35 or 45 wt % plasticizer.

Filler

The amine-containing component, the isocyanate-containing component or both comprise filler. Useful fillers are typically solids that are non-reactive with the other components of the compositions of the invention. Useful fillers include, for example, clay, talc, dye particles, pigments and colorants (for example, $TiO_2$ or carbon black), glass beads, metal oxide particles, silica particles, ceramic microspheres, hollow polymeric microspheres (such as those available under the trade designation EXPANCEL 551 DE from Akzo Nobel, Duluth, Ga.), hollow glass microspheres (such as those available under the trade designation K37 from Minnesota Mining and Manufacturing Co., St Paul, Minn.), carbonates, metal oxides, silicates (e.g. talc, asbestos, clays, mica), sulfates, silicon dioxide and aluminum trihydrate.

Some specific examples include ground or light calcium carbonate (with or without a surface-treatment such as a fatty acid, resin acid, cationic surfactant, or anionic surfactant); magnesium carbonate; talc; sulfates such as barium sulfate; alumina; metals in powder form (e.g., aluminum, zinc and iron); bentonite; kaolin clay; quartz powder; and combinations of two or more.

Examples of useful organic pigments include Halogenated copper phthalocyanines, Aniline Blacks, Anthraquinone blacks, Benzimidazolones, Azo condensations, Arylamides, Diarylides, Disazo condensations, Isoindolinones, Isoindolines, Quinophthalones, Anthrapyrimidines, Flavanthrones, Pyrazolone oranges, Perinone oranges, Beta-naphthols, BON arylamides, Quinacridones, Perylenes, Anthraquinones, Dibromanthrones, Pyranthrones, Diketopyrrolopyrrole pigments (DPP), Dioxazine violets, Copper & Copper-free phthalocyanines, Indanthrones, and the like.

Examples of useful inorganic pigments include Titanium dioxide, Zinc oxide, Zinc sulphide, Lithopone, Antimony oxide, Barium sulfate, Carbon Black, Graphite, Black Iron Oxide, Black Micaceous Iron Oxide, Brown Iron oxides, Metal complex browns, Lead chromate, Cadmium yellow, Yellow oxides, Bismuth vanadate, Lead chromate, Lead molybdate, Cadmium red, Red iron oxide, Prussian blue, Ultramarine, Cobalt blue, Chrome green (Brunswick green), Chromium oxide, Hydrated chromium oxide, Organic metal complexes, laked dye pigments and the like.

The filler can also comprise conductive particles (see, for example, U.S. Patent Application Pub. No. 2003/0051807) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal or the like.

Preferred fillers include inorganic solids such, for example, talc, titanium dioxide, silica, zirconia, calcium carbonate, calcium magnesium carbonate, glass or ceramic microspheres, and combinations thereof. In some embodiments, titanium dioxide and/or calcium carbonate are preferred.

In some embodiments, the filler is employed in the isocyanate-containing component at a concentration of at least about 5 wt. %, or 10 wt. %, or 20 wt. % to about 40 wt. %. In some embodiments, both the isocyanate-containing component and the amine-containing component comprise filler. The amine-containing component may comprise filler at an even higher concentration than the isocyanate-containing component. The filler concentration of the amine-containing component may range from about 50 wt. % to about 70 wt. %. Overall, the total composition typically comprises at least about 5%, 10%, or 15% to about 45% by volume filler.

Other/Optional Components

The compositions can also include other viscosity-modifying agents, diluents, and the like. Viscosity modifying agents can include liquids such as ketones, esters, and hydrocarbons; homopolymers or copolymers such as poly(styrene), poly(meth)acrylates such as poly(methyl methacrylate), and styrene-butadiene block copolymers; and silicas such as fumed silica and surface-modified fumed silica. Diluents can include liquids such as ketones, esters, and hydrocarbons.

Features/Uses of the Compositions

In some embodiments, the shrinkage of a pavement marking including the pavement marking composition is less than 1.5% or even less than 1%.

The pavement marking compositions described herein can form a reactive mixture and can be applied to a traffic bearing surface to form a pavement marking. The pavement markings exhibit good adhesion to a wide variety of substrates and surfaces, including concrete and asphalt. Track-free time of the pavement marking is the time after the marking is applied before cars can drive on the marking without picking up and tracking the applied marking. The track-free time can be measured in the laboratory using ASTM D711-10 or in the field using ASTM D713-90. In some embodiments, the compositions of the invention exhibit a track-free time of about 360 seconds or less when measured according to ASTM D711-10.

Further, once applied to a traffic bearing surface, the pavement marking composition has a sufficient open time (i.e., the length of time the composition will remain in a liquid state after application to a surface) to adequately wet out to the surface being applied to in combination with good anchoring of the reflective elements. Cure speed can be determined in the laboratory by measuring cup cure speed and/or through cure speed as described below in the Examples. In some embodiments, the compositions of the invention exhibit a cup cure speed of about 60 seconds or longer. In some embodiments, the cup cure speed is from about 60 seconds to about 3600, 1200 or 360 seconds. In some embodiments, the surface of the composition cures more rapidly than the bulk. This "skinning" effect allows for substantially rapid track-free times while slower through cure times allow time for wetting of the substrate.

In many embodiments, the pavement marking composition and/or pavement markings formed by the pavement marking compositions include reflective elements and/or optical elements. One exemplary type of reflective elements is retroreflective elements. One exemplary type of retroreflective elements is microcrystalline microspheres. The microcrystalline microspheres may be non-vitreous, as described in U.S. Pat. No. 4,564,556 (Lange) or the microspheres may comprise a glass-ceramic material, as described in U.S. Pat. No. 6,461,988, both of which are incorporated herein by reference. The retroreflective elements can have a refractive index of about 1.5 to about 2.6 and can have a diameter ranging from about 30 micrometers to about 100 micrometers. The approximate open time can be assessed using one of the tests in ASTM D1640-95. Alternatively, it can be determined by spraying a coating and applying reflective elements and determining the maximum time after spraying that the beads can be applied and good bead sinking and adhesion can be obtained.

For embodiments wherein the marking is intended to provide nighttime visibility, the reactive mixture exhibits good adhesion to the retroreflective elements. Good adhesion to surface being applied to in combination with good adhesion to the retroreflective elements contribute to the retained retroreflectivity of the pavement marking. As used herein, "retained reflectivity" is used to describe the maintained retroreflective performance of a pavement marker over its useful life. Retroreflectivity of pavement markings is typically measured by a portable instrument in the field at a fixed entrance angle and observation angle according to ASTM E 1710-95a that approximates the conditions a driver actually views a pavement marking. The pavement marking compositions of the present invention provide polyurea coatings having conventional daytime visibility. They can also function as binders to anchor reflective optical elements. Generally, the reflective elements do not exceed about several millimeters in diameter. When the reflective elements are glass or ceramic microspheres, they are typically in the range of about 200 micrometers to about 600 micrometers.

The reflective elements can be in the form of glass beads (also referred to as microspheres or microsphere lenses) that are preferably light transmissible. Chemical treatment of bead surfaces, such as with an organochromium compound, may be utilized as known in the art to enhance resin to glass adhesion. Other chemical coupling agents such as silanes, titanates and zirconates are also known. Additionally, fluorocarbon treatment of the glass beads can aid in achieving substantially uniform hemispherical bead sinkage.

Post-spray applied elements in the form of glass or ceramic beads or microspheres can also be used as a binder filler in addition to providing night time reflectivity. They may function similarly to mineral particulates on the wear surface of a coated abrasive (sandpaper), protecting the polymeric binder from applied stresses. The microsphere average diameter, application or coverage rate (weight per unit area) and surface chemistry (e.g., treatment with coupling agent) affect the durability of pavement markings. Preferably, typical coverage rates correspond to greater than about 4 pounds of glass beads per gallon (479 grams/liter) of binder, more preferably, greater than about 10 pounds per gallon (1200 grams/liter). This corresponds to, preferably, greater than about 6 grams glass beads per 300 cm2 area, for a 15 mil (0.4 mm) thick cured film, more preferably greater than about 15 grams of glass beads per 300 cm2 area for a 0.4 mm thick cured film.

The reflective elements can also be in the form of ceramic microspheres (i.e., beads). "Ceramic" is used herein to refer to inorganic materials which can be either crystalline (a material having a patterned atomic structure sufficient to produce a characteristic x-ray diffraction pattern) or amorphous (a material having no long range order in its atomic structure evidenced by the lack of a characteristic x-ray diffraction pattern). Amorphous ceramics are more commonly known as glasses. Ceramic beads are preferred as they are more durable and more resistant to wear than are glass microspheres. Prior to the present invention, ceramic beads have not been practical to use in painted pavement markings because the binder has not been sufficiently durable and adherent to roads.

The ceramic beads or other reflective microspheres can be applied directly to the binder coated on the pavement surface. Alternatively, they can be applied in the form of retroreflective optical elements having vertical surfaces. Vertical surfaces provide better orientation for retroreflection. Also, they may prevent the build-up of a layer of water over the retroreflective surface during rainy weather, which otherwise interferes with the retroreflection mechanism.

One type of such retroreflective optical elements with vertical surfaces is made up of pellets comprising a thermoplastic core coated with ceramic beads. Such reflective elements and methods of making them are disclosed in the published International Publication No. WO 97/03814 (Bescup, et al.). Layered elements have been made using polymers having differing melt behavior. The retroreflective elements include a plurality of optical elements, such as glass or ceramic microspheres, partially embedded in the vertical surfaces of the reflective element core's central layer. Such reflective elements and methods of making them are disclosed in International Publication No. WO 97/28471.

All-ceramic retroreflective elements can be made, which may be used in pavement markings, with greatly improved resistance to wear and the effects of weathering. These retroreflective elements are preferably free of metals and polymeric material. These retroreflective elements are comprised of an opacified ceramic core and ceramic optical elements partially embedded into the core. The opacified ceramic cores of these composite reflective optical elements will often contain a mixture of amorphous (glass) and crystalline phases. The retroreflective element may be irregular in shape or in the form of a sphere, disc, tile, etc. The diffuse reflecting ceramic core, in combination with the transparent optical elements embedded in the surface, provides a surprisingly bright retroreflective element without the gray coloration and the susceptibility to corrosion associated with metallic specular reflectors. Such reflective elements and methods of making them are disclosed in U.S. Pat. No. 5,774,265.

Many other variations of composite retroreflective elements or aggregates are known which have a polymeric core with optical elements embedded in the core surface. See, for example, U.S. Pat. Nos. 3,252,376; 3,254,563; 4,983,458; 4,072,403; 4,652,172; and 5,268,789. Other retroreflective elements can also be constructed having a ceramic core and glass optical elements with a metallic specular coating. See, for example, U.S. Pat. Nos. 3,043,196; 3,175,935; 3,556,637; 3,274,888; and 3,486,952; and EP Publication No. 0,322,671. Ceramic retroreflective elements typically exhibit greater resistance to weathering and to wear. Some known embodiments also contain optical elements dispersed throughout the core. The core may be irregular in shape or may be regularly shaped e.g., spheres, tetrahedrons, discs, square tiles, etc. Retroreflective elements are advantageous because they can be embedded into inexpensive painted markings.

Whatever the type of reflective element, they can be flood coated onto the entire surface of the binder painted on the pavement surface; however, this can be quite expensive for ceramic microspheres. Alternatively, the reflective elements can be positioned only in the most efficient optical part of the surface. Control of element placement on liquid markings is important for obtaining durable high retroreflectivity. They can also be included within one of the components prior to mixing and applied, for example, during the spray coating of the two-component liquid.

Also, it is important to understand the mechanism of embedment of elements, whether in the form of coated pellets or microspheres. Surface treatments can be used to obtain appropriate sinkage, not too deep or not too shallow, and control wetting and capillation of the coating up the sides of the element. Also, the cure rheology of the two-part binder system can affect the ability to sink elements.

Pavements markings are often used to define lanes and therefore applied as continuous lines on the edge of a lane or in dashed lines separating lanes, referred to as skips. Such markings are referred to as longitudinal markings in that the lines run parallel to the direction of travel. In actual use a relatively small percent of vehicles using the road will actually traverse these markings. Alternatively, pavement markings are also used to mark intersections in the form of stopbars, continental blocks, or symbols and legends. In actual use, a relatively large percent of vehicles using the road will actually traverse such markings, or portions of such markings.

EXAMPLES

Objects and advantages of this invention are further illustrated by the following examples, but the particular materials and amounts thereof recited in these examples, as well as other conditions and details, should not be construed to unduly limit this invention.

All parts, percentages, ratios, etc. in the examples are by weight, unless noted otherwise. Solvents and other reagents used were obtained from Sigma-Aldrich Chemical Company; Milwaukee, Wis. unless specified differently.

Materials

| Trade designation | Material | Supplier |
|---|---|---|
| DESMODUR N3300 | Hexamethylene diisocyanate-based isocyanurate having a viscosity of about 3,000 mPa · s | Bayer MaterialScience, Pittsburgh, PA |
| DESMODUR N3600 | Hexamethylene diisocyanate-based isocyanurate having a viscosity of about 1,200 mPa · s | Bayer MaterialScience, Pittsburgh, PA |
| DESMODUR VP LS2371 | Isophorone diisocyanate-based isocyanate prepolymer having a viscosity of about 11,000 mPa · s | Bayer MaterialScience |
| ETHACURE 90 | bis(alkylamino)alkyl amine, linear aliphatic sterically hindered secondary diamine | Albemarle, Baton Rouge, LA |
| CLEARLINK 1000 | Cycloaliphatic sterically hindered secondary diamine | Dorf Ketal Chemicals, Stafford, TX |
| Ti PURE 900 | Titanium dioxide pigment | DuPont Titanium Technologies, Wilmington, DE |
| OMYACARB 5FL | Calcium carbonate | Omya Inca, Proctor, VT |
| — | Acetone | JT Baker, Phillipsburg, NJ |
| JEFFLINK 754 | Cycloaliphatic, bis(secondary amine) | Huntsman, The Woodlands, TX |
| MESAMOLL | alkylsulphonic acid phenyl ester, a phthalate-free general purpose plasticizer | Lanxess, Pittsburgh, PA |
| BAYLITH L POWDER | A potassium calcium sodium aluminosilicate of the zeolite A type with an approximate pore size of 3 Å | A.B. Colby, McMurry, PA |
| RHODIASOLV IRIS | Dibasic ester | Rhodia, Bristol, PA |
| PRIFER 6813 | Alkyl ester | Croda USA, Edison, NJ |

Test Methods

Cup Cure Speed

Components were added into a small cup and hand mixed with a tongue depressor. The point in time where the mixture could no longer be mixed was recorded as the Cup Cure Speed.

Through Cure Speed

On a coating of 635 micron (25 mil) wet film thickness, a tongue depressor was dragged across the surface using only the weight of the tongue depressor on the surface. The time at which no visible effect occurred as a result of dragging was recorded as the Through Cure Speed.

Viscosity

Viscosity was measured with a Brookfield RV Viscometer (available from Brookfield Engineering Laboratories, Inc., Middleboro, Mass.). In Comparative Examples C1-C10 and in Examples 1-10 a number 7 spindle was used at 50 rpm with a multiplier of 800 at 22.2° C. (72° F.). In Examples 11-15 a number 6 spindle was used at 50 rpm with a multiplier of 200 at 22.8° C. (73° F.).

Modulus

Modulus of elasticity was measured in accordance with ASTM D638-08.

Whiteness

Whiteness (Cap Y) was collected in using a MiniScan EZ colorimeter available from Hunter Associates Laboratory, Inc, Reston Va. Data was collected shortly after making samples (Initial Cap Y) and after aging for 30 minutes at 80° C. (Heat Aged Cap Y).

Gloss

Gloss was measured with a micro-Tri-gloss gloss meter available from BYK-Gardner Inc., Silver Spring, Md.

Trackfree Time

Trackfree time was determined in accordance with ASTM D711-10.

Taber Abrasion

Taber abrasion data was collected in accordance with ASTM D4060-07.

Shore D Hardness

Hardness was measured in accordance with ASTM D2240-05.

Shrinkage

Shrinkage of the coatings was measured using a laser interferometer and a ball slide stage. Samples of each coating were cut and removed from the release paper. Each sample was approximately 2.5 cm (1 inch) wide by 25 cm (10 inches) long. Each sample was tested by accurately measuring the initial sample length and then storing the sample in a 65.6° C. (150° F.) oven and repeating the measurement after three weeks of storage at 65.6° C. (150° F.). The amount of shrinkage was then determined as $(1-L/L_0)*100\%$, where L and $L_0$ are the length after three weeks and the initial length respectively.

Comparative Examples C1-C10

Pavement marking compositions were prepared by mixing an isocyanate-containing component with an amine-containing component. The isocyanate-component for Comparative Examples C1-C10 was DESMODUR N3300. The amine-containing components were prepared by mixing the ingredients listed by weight percent in Table 1 using a 150DAC SpeedMixer™ dual asymmetric centrifuge mixer, (FlackTek, Inc Landrum, S.C.). The ingredients were charged into a mixing vessel, placed in the mixer and mixed at 2750 rpm for 2 minutes. The viscosities of the amine-containing components were measured as previously described and are reported in Table 1.

The isocyanate-containing component and the amine-containing component were loaded into a dual cartridge syringe of volume ratio 1:2 so that one volume fraction of the isocyanate reacted with two volume fractions of amine. The mixture was dispensed from the cartridge through a 20 element static mixer at 25° C. Coatings were made of the mixed material at 635 micron (25 mil) wet film thickness on 10 cm by 20 cm (4 inch by 8 inch) aluminum Q-panels that had been previously cleaned by wiping with acetone. The coatings were allowed to cure at 25° C.

The isocyanate index (NCO INDEX), the ratio of the isocyanate equivalents to the amine equivalents in the total composition, was 1.10 for each of Comparative Examples C1-C10. The volume ratio of the isocyanate-containing component (NCO) to the amine-containing component (NH) was 0.5 for each of Comparative Examples C1-C10.

Cup Cure Speed and modulus were measured as previously described and are reported in Table 2.

TABLE 2

| Example | Cup Cure Speed (seconds) | Modulus (MPa) |
| --- | --- | --- |
| C1 | 21 | 746 |
| C2 | 10 | 876 |
| C3 | 60 | 986 |
| C4 | 12 | 945 |
| C5 | 16 | 968 |
| C6 | 11 | 1099 |
| C7 | 14 | 995 |
| C8 | 32 | 765 |
| C9 | 19 | 854 |
| C10 | 31 | 1059 |

Examples 1-10

Pavement marking compositions were prepared by mixing an isocyanate-containing component with an amine-containing component. The isocyanate-component for Examples 1-10 was a blend of 70.0 parts by weight of DESMODUR N3300 and 30.0 parts by weight of DESMODUR VP LS2371. The amine-containing components were prepared by mixing the ingredients listed by weight percent in Table 3. Formulations were blended using a 150DAC SpeedMixer™ dual asymmetric centrifuge mixer, (FlackTek, Inc Landrum, S.C.). The ingredients for the amine-containing component were charged into a mixing vessel, placed in the mixer and mixed at 3500 rpm for 5 minutes. The ingredients for the isocyanate-containing component were mixed at 1750 rpm for 2 minutes. The viscosities of the amine-containing components were measured as previously described and are reported in Table 4.

The isocyanate-containing component and the amine-containing component were loaded into a dual cartridge syringe of volume ratio 1:2 so that one volume fraction of the isocyanate reacted with two volume fractions of amine. The mixture was dispensed from the cartridge through a 20 element static mixer at 25° C. Coatings were made of the mixed material at 635 micron (25 mil) wet film thickness on 10 cm by 20 cm (4 inch by 8 inch) aluminum Q-panels previously cleaned by wiping with acetone and samples were also made on release liner. The coatings were allowed to cure at 25° C. overnight and then placed in an 80° C. oven for 30 minutes before testing.

The isocyanate index was 1.21 for each of Examples 1-10. The volume ratio of the isocyanate-containing component (NCO) to the amine-containing component (NH) was 0.5 for each of Examples 1-10.

Shrinkage, Cup Cure Speed, Through Cure Speed and Trackfree Time were measured as previously described and are reported in Table 4. Modulus, Shore D Hardness, and

TABLE 1

| Example | CLEARLINK 1000 | JEFFLINK 754 | ETHACURE 90 | DESMODUR VP LS2371 | TIPURE R960 | Viscosity (Pa s) |
| --- | --- | --- | --- | --- | --- | --- |
| C1 | 39.2 | 0.0 | 0.0 | 29.4 | 31.4 | 15.8 |
| C2 | 0.0 | 21.1 | 0.0 | 15.8 | 63.2 | 64.0 |
| C3 | 0.0 | 0.0 | 29.9 | 22.4 | 47.8 | 5.1 |
| C4 | 13.7 | 13.7 | 0.0 | 20.5 | 52.1 | 21.2 |
| C5 | 9.4 | 9.4 | 9.4 | 21.1 | 50.7 | 11.9 |
| C6 | 4.0 | 16.1 | 4.0 | 18.1 | 57.8 | 28.0 |
| C7 | 0.0 | 12.3 | 12.3 | 18.5 | 56.8 | 18.4 |
| C8 | 4.8 | 4.8 | 19.3 | 21.7 | 49.3 | 9.3 |
| C9 | 21.9 | 5.5 | 5.5 | 24.6 | 42.6 | 13.1 |
| C10 | 16.9 | 0.0 | 16.9 | 25.4 | 40.7 | 7.8 |

Taber Abrasion were measured as previously described and are reported in Table 5. Whiteness (Cap Y) and Gloss were measured as previously described and are reported in Table 6.

TABLE 3

| Ex. | CLEARLINK 1000 | JEFFLINK 754 | ETHACURE 90 | TIPURE R960 | MESAMOLL | BAYLITH L POWDER |
|---|---|---|---|---|---|---|
| 1 | 7.0 | 0.0 | 7.0 | 63.6 | 16.1 | 6.4 |
| 2 | 14.9 | 0.0 | 0.0 | 62.5 | 16.2 | 6.4 |
| 3 | 4.2 | 4.2 | 4.3 | 65.2 | 15.9 | 6.1 |
| 4 | 0.0 | 5.9 | 5.9 | 66.4 | 15.7 | 6.1 |
| 5 | 2.2 | 2.2 | 8.6 | 64.6 | 16.3 | 6.2 |
| 6 | 0.0 | 10.9 | 0.0 | 68.0 | 15.2 | 5.9 |
| 7 | 0.0 | 0.0 | 13.1 | 64.3 | 16.3 | 6.3 |
| 8 | 9.1 | 2.3 | 2.3 | 64.2 | 15.8 | 6.3 |
| 9 | 6.3 | 6.3 | 0.0 | 65.6 | 15.8 | 6.0 |
| 10 | 2.0 | 7.8 | 2.0 | 66.8 | 15.5 | 6.0 |

TABLE 4

| Example | Amine Component Viscosity (Pa s) | 3 Week Shrinkage (%) | Cup Cure Speed (seconds) | Through Cure (seconds) | Trackfree (seconds) |
|---|---|---|---|---|---|
| 1 | 11.5 | 0.40 | 510 | 1260 | 120 |
| 2 | 12.1 | 0.39 | 350 | 840 | 65 |
| 3 | 16.4 | 0.44 | 270 | 750 | 80 |
| 4 | 17.6 | 0.32 | 270 | 750 | 90 |
| 5 | 13.0 | 0.93 | 570 | 1260 | 240 |
| 6 | 51.2 | 0.47 | 150 | 420 | 90 |
| 7 | 16.0 | 0.39 | 1140 | 2400 | 360 |
| 8 | 16.6 | NA | 900 | 1560 | 360 |
| 9 | 26.5 | 0.42 | 261 | 525 | 67.5 |
| 10 | 33.3 | 0.39 | 240 | 540 | 75 |

TABLE 5

| Example | Modulus (MPa) | Shore D Hardness | Taber Abrasion (mg wt loss) |
|---|---|---|---|
| 1 | 931 | 64.7 | 86.6 |
| 2 | 1040 | 68.0 | 60.9 |
| 3 | 1007 | 63.0 | 76.0 |
| 4 | 768 | 62.3 | 105.9 |
| 5 | 706 | 62.0 | 72.3 |
| 6 | 747 | 61.5 | 106.3 |
| 7 | 651 | 56.1 | 88.4 |
| 8 | 742 | 64.3 | 50.9 |
| 9 | 907 | 66.0 | 89.9 |
| 10 | 855 | 63.8 | 84.8 |

TABLE 6

| Example | Initial Cap Y | Heat Aged Cap Y | Initial Gloss | Heat Aged Gloss |
|---|---|---|---|---|
| 1 | 96.71 | 97.52 | 84.00 | 35.00 |
| 2 | 96.91 | 97.59 | 89.50 | 46.33 |
| 3 | 96.86 | 97.88 | 89.00 | 34.00 |
| 4 | 96.86 | 97.31 | 69.33 | 27.33 |
| 5 | 97.29 | 96.23 | 84.67 | 28.33 |
| 6 | 96.71 | 98.53 | 85.92 | 30.67 |
| 7 | 97.01 | 91.13 | 82.67 | 15.17 |
| 8 | 96.68 | 97.53 | 88.00 | 44.00 |
| 9 | 96.91 | 97.96 | 88.17 | 39.67 |
| 10 | 97.07 | 98.29 | 88.33 | 34.67 |

Examples 11-15

Pavement marking compositions were prepared by mixing an isocyanate-containing component with an amine-containing component. The isocyanate-components for Examples 11-15 were prepared by mixing the ingredients listed by weight percent in Table 7. The amine-containing components were prepared by mixing the ingredients listed by weight percent in Table 8. Formulations were blended using a 150DAC SpeedMixer™ dual asymmetric centrifuge mixer, (FlackTek, Inc Landrum, S.C.). The ingredients for the amine-containing component were charged into a mixing vessel, placed in the mixer and mixed at 3500 rpm for 5 minutes. The ingredients for the isocyanate-containing component were mixed at 1750 rpm for 2 minutes. The viscosities of the amine-containing components were measured as previously described and are reported in Table 8.

These components were loaded into a dual cartridge syringe of volume ratio 1:2 so that one volume fraction of the isocyanate reacted with two volume fractions of amine. The mixture was dispensed from the cartridge through a 20 element static mixer at 25° C. Coatings were made of the mixed material at 635 micron (25 mil) wet film thickness on 10 cm by 20 cm (4 inch by 8 inch) aluminum Q-panels previously cleaned by wiping with acetone and samples were also made on release liner. The coatings were allowed to cure at 25° C. overnight and then placed in an 80° C. oven for 30 minutes before testing.

The isocyanate index was 1.21 for each of Examples 11-15. The volume ratio of the isocyanate-containing component (NCO) to the amine-containing component (NH) was 0.5 for each of Examples 11-15.

Through Cure Speed, Trackfree Time, Shore D Hardness, and Taber Abrasion were measured and are reported in Table 9. Whiteness (Cap Y) was measured and is reported in Table 10.

TABLE 7

| Example | DESMODUR N3300 | DESMODUR VP LS2371 |
|---|---|---|
| 11 | 70.0 | 30.0 |
| 12 | 75.0 | 25.0 |
| 13 | 70.0 | 30.0 |
| 14 | 80.0 | 20.0 |
| 15 | 80.0 | 20.0 |

TABLE 8

| Ex. | CLEARLINK 1000 | JEFFLINK 754 | OMYACARB 5FL | TIPURE R960 | MESAMOLL | BAYLITH L POWDER |
|---|---|---|---|---|---|---|
| 11 | 14.9 | 0.0 | 0.0 | 62.5 | 16.4 | 6.2 |
| 12 | 11.9 | 4.0 | 16.6 | 43.1 | 17.7 | 6.8 |
| 13 | 7.4 | 7.4 | 42.1 | 17.2 | 18.6 | 7.1 |
| 14 | 20.3 | 0.0 | 33.5 | 18.5 | 20.0 | 7.6 |
| 15 | 7.5 | 7.5 | 0.0 | 62.1 | 16.6 | 6.4 |

TABLE 9

| Example | Viscosity (Pa s) | Through Cure (seconds) | Trackfree (seconds) | Shore D Hardness | Taber Abrasion (mg wt loss) |
|---|---|---|---|---|---|
| 11 | 16.0 | 675 | 60.0 | 74.8 | 60.1 |
| 12 | 3.24 | 423.8 | 45.0 | 73.6 | 46.4 |
| 13 | 2.30 | 262.5 | 42.5 | 65.8 | 54.9 |
| 14 | 1.11 | 630 | 60.0 | 70.4 | 29.9 |
| 15 | 12.2 | 247.5 | 45.0 | 70.8 | 47.5 |

TABLE 10

| Example | Initial Cap Y | Heat Aged Cap Y |
|---|---|---|
| 11 | 96.14 | 96.37 |
| 12 | 95.17 | 95.47 |
| 13 | 92.77 | 92.96 |
| 14 | 93.09 | 93.30 |
| 15 | 96.40 | 96.54 |

Comparative Example C11 and Examples 16-19

Pavement marking compositions were prepared by mixing an isocyanate-containing component with an amine-containing component. The isocyanate-components for Comparative Example C11 and for Examples 16-19 were prepared by mixing the ingredients listed by weight percent in Table 11. The amine-containing components were prepared by mixing the ingredients listed by weight percent in Table 12. Formulations were blended using a 150DAC SpeedMixer™ dual asymmetric centrifuge mixer, (FlackTek, Inc Landrum, S.C.). The ingredients for each component were charged into a mixing vessel, placed in the mixer and mixed at 2750 rpm for 2 minutes.

The isocyanate index (NCO INDEX) was determined as is reported in Table 13. The volume ratio of the isocyanate-containing component (NCO) to the amine-containing component (NH) was 0.5 for each of Examples 16-19 and Comparative Example C11. The weight percent of MESAMOLL in the pavement marking compositions are reported in Table 13. The Cup Cure Speeds were measured as previously described and are reported in Table 13.

TABLE 11

|  | C11 | Ex. 16 | Ex. 17 | Ex. 18 | Ex. 19 |
|---|---|---|---|---|---|
| DESMODUR N3300 | 70.0 | 58.8 | 50.7 | 39.8 | 32.7 |
| DESMODUR VP LS2371 | 30.0 | 25.2 | 21.7 | 17.0 | 14.0 |
| MESAMOLL | 0.0 | 16.0 | 27.5 | 43.2 | 58.3 |

TABLE 12

|  | C11 | Ex. 16 | Ex. 17 | Ex. 18 | Ex. 19 |
|---|---|---|---|---|---|
| JEFFLINK 754 | 11.0 | 9.9 | 9.0 | 7.6 | 6.6 |
| ETHACURE 90 | 1.2 | 1.1 | 1.0 | 0.8 | 0.7 |
| MESAMOLL | 0.0 | 9.9 | 18.0 | 30.5 | 39.7 |
| DESMODUR VP LS2371 | 12.2 | 11.0 | 10.0 | 8.5 | 7.4 |
| TIPURE R960 | 32.9 | 29.7 | 27.0 | 22.9 | 19.9 |
| BAYLITH L POWDER | 7.3 | 6.6 | 6.0 | 5.1 | 4.4 |
| OMYACARB 5FL | 35.4 | 31.9 | 29.0 | 24.6 | 21.3 |

TABLE 13

|  | C11 | Ex. 16 | Ex. 17 | Ex. 18 | Ex. 19 |
|---|---|---|---|---|---|
| NCO INDEX | 1.34 | 1.33 | 1.32 | 1.31 | 1.30 |
| Total MESAMOLL Wt % | 0.0 | 11.33 | 20.34 | 33.76 | 43.32 |
| Cup Cure Speed (seconds) | 49 | 84 | 145 | 325 | 525 |

Comparative Examples C12-C15

Pavement marking compositions were prepared by mixing an isocyanate-containing component with an amine-containing component. The isocyanate-component for Comparative Examples C12-C15 was DESMODUR N3600. The amine-containing component was prepared by mixing the ingredients listed by weight percent in Table 14 using a 150DAC SpeedMixer™ dual asymmetric centrifuge mixer (FlackTek, Inc Landrum, S.C.). The ingredients were charged into a mixing vessel, placed in the mixer and mixed at 2750 rpm for 2 minutes.

The isocyanate index was 1.10 for each of Comparative Examples C12-C15. The volume ratio of the isocyanate-containing component (NCO) to the amine-containing component (NH) was 0.5 for each of Comparative Examples C12-C15. The Cup Cure Speeds were measured as previously described and are reported in Table 14 along with the weight percent of MESAMOLL in the pavement marking compositions.

TABLE 14

|  | C12 | C13 | C14 | C15 |
|---|---|---|---|---|
| JEFFLINK 754 | 100.0 | 92.5 | 86.0 | 75.4 |
| MESAMOLL | 0.0 | 7.5 | 14.0 | 24.6 |

TABLE 15

|  | C12 | C13 | C14 | C15 |
|---|---|---|---|---|
| Cup Cure Speed (seconds) | 15 | 15 | 15 | 15 |
| Total MESAMOLL Wt % | 0.0 | 4.75 | 9.07 | 16.64 |

Examples 20-39

Pavement marking compositions were prepared by mixing an isocyanate-containing component with an amine-containing component. The isocyanate-components for Examples 20-39 were prepared by mixing the ingredients listed by weight percent in Table 16. The amine-containing components were prepared by mixing the ingredients listed by weight percent in Tables 17 and 18. Formulations were blended using a 150DAC SpeedMixer™ dual asymmetric centrifuge mixer, (FlackTek, Inc Landrum, S.C.). The ingredients for each component were charged into a mixing vessel, placed in the mixer and mixed at 2750 rpm for 2 minutes.

The Cup Cure Speeds were measured as previously described and are reported in Table 19 along with the total wt percent of plasticizer in the pavement marking compositions.

TABLE 16

| Example | DESMODUR N3300 | DESMODUR VP LS2371 | Plasticizer Type | Plasticizer, Wt % |
|---|---|---|---|---|
| 20 | 58.87 | 25.23 | RHODIASOLV IRIS | 15.90 |
| 21 | 50.80 | 21.77 | RHODIASOLV IRIS | 27.43 |
| 22 | 39.94 | 17.12 | RHODIASOLV IRIS | 42.94 |
| 23 | 32.88 | 14.09 | RHODIASOLV IRIS | 53.02 |
| 24 | 59.63 | 25.55 | PRIFER 6813 | 14.82 |
| 25 | 51.93 | 22.26 | PRIFER 6813 | 25.82 |
| 26 | 41.32 | 17.71 | PRIFER 6813 | 40.97 |
| 27 | 34.31 | 14.71 | PRIFER 6813 | 50.98 |
| 28 | 59.47 | 25.49 | Dioctyl phthalate | 15.04 |
| 29 | 51.70 | 22.16 | Dioctyl phthalate | 26.14 |
| 30 | 41.01 | 17.57 | Dioctyl phthalate | 41.42 |
| 31 | 33.98 | 14.56 | Dioctyl phthalate | 51.46 |
| 32 | 59.57 | 25.53 | Diisononyl phthalate | 14.89 |
| 33 | 51.85 | 22.22 | Diisononyl phthalate | 25.93 |
| 34 | 41.25 | 17.68 | Diisononyl phthalate | 41.07 |
| 35 | 34.22 | 14.67 | Diisononyl phthalate | 51.11 |
| 36 | 59.47 | 25.49 | Bis 2-ethylhexyl phthalate | 15.04 |
| 37 | 51.70 | 22.16 | Bis 2-ethylhexyl phthalate | 26.14 |
| 38 | 41.01 | 17.57 | Bis 2-ethylhexyl phthalate | 41.42 |
| 39 | 33.98 | 14.56 | Bis 2-ethylhexyl phthalate | 51.46 |

TABLE 17

| Ex. | JEFFLINK 754 | ETHACURE 90 | Plasticizer Type | Plasticizer Wt % | DESMODUR VP LS2371 |
|---|---|---|---|---|---|
| 20 | 9.90 | 1.10 | RHODIASOLV IRIS | 9.79 | 11.00 |
| 21 | 9.02 | 1.00 | RHODIASOLV IRIS | 17.84 | 10.02 |
| 22 | 7.66 | 0.85 | RHODIASOLV IRIS | 30.21 | 8.51 |
| 23 | 6.65 | 0.74 | RHODIASOLV IRIS | 39.37 | 7.39 |
| 24 | 9.98 | 1.11 | PRIFER 6813 | 9.09 | 11.09 |
| 25 | 9.15 | 1.02 | PRIFER 6813 | 16.67 | 10.16 |
| 26 | 7.84 | 0.87 | PRIFER 6813 | 28.57 | 8.71 |
| 27 | 6.86 | 0.76 | PRIFER 6813 | 37.50 | 7.62 |
| 28 | 9.96 | 1.11 | Dioctyl phthalate | 9.29 | 11.06 |
| 29 | 9.12 | 1.01 | Dioctyl phthalate | 16.92 | 10.13 |
| 30 | 7.80 | 0.87 | Dioctyl phthalate | 28.94 | 8.67 |
| 31 | 6.81 | 0.76 | Dioctyl phthalate | 37.93 | 7.57 |
| 32 | 9.97 | 1.11 | Diisononyl phthalate | 9.14 | 11.08 |
| 33 | 9.14 | 1.02 | Diisononyl phthalate | 16.75 | 10.15 |
| 34 | 7.83 | 0.87 | Diisononyl phthalate | 28.63 | 8.70 |
| 35 | 6.85 | 0.76 | Diisononyl phthalate | 37.57 | 7.61 |
| 36 | 9.96 | 1.11 | Bis 2-ethylhexyl phthalate | 9.29 | 11.06 |
| 37 | 9.12 | 1.01 | Bis 2-ethylhexyl phthalate | 16.92 | 10.13 |
| 38 | 7.80 | 0.87 | Bis 2-ethylhexyl phthalate | 28.94 | 8.67 |
| 39 | 6.81 | 0.76 | Bis 2-ethylhexyl phthalate | 37.93 | 7.57 |

TABLE 18

| Example | TIPURE R960 | BAYLITH L Powder | OMYACARB 5FL |
|---|---|---|---|
| 20 | 29.70 | 6.60 | 31.90 |
| 21 | 27.05 | 6.01 | 29.06 |
| 22 | 22.98 | 5.11 | 24.68 |
| 23 | 19.96 | 4.44 | 21.44 |
| 24 | 29.93 | 6.65 | 32.15 |
| 25 | 27.44 | 6.10 | 29.47 |
| 26 | 23.52 | 5.23 | 25.26 |
| 27 | 20.58 | 4.57 | 22.10 |
| 28 | 29.87 | 6.64 | 32.08 |
| 29 | 27.36 | 6.08 | 29.38 |
| 30 | 23.40 | 5.20 | 25.13 |
| 31 | 20.44 | 4.54 | 21.95 |
| 32 | 29.92 | 6.65 | 32.13 |
| 33 | 27.41 | 6.09 | 29.44 |
| 34 | 23.50 | 5.22 | 25.24 |
| 35 | 20.56 | 4.57 | 22.08 |
| 36 | 29.87 | 6.64 | 32.08 |
| 37 | 27.36 | 6.08 | 29.38 |
| 38 | 23.40 | 5.20 | 25.13 |
| 39 | 20.44 | 4.54 | 21.95 |

TABLE 19

| Example | Total Plasticizer Wt % | Cup Cure Speed (seconds) |
|---|---|---|
| 20 | 11.23 | 125 |
| 21 | 20.19 | 169 |
| 22 | 33.53 | 222 |
| 23 | 43.07 | 310 |
| 24 | 10.43 | 130 |
| 25 | 18.91 | 195 |
| 26 | 31.78 | 352 |
| 27 | 41.12 | 632 |
| 28 | 10.65 | 126 |
| 29 | 19.17 | 215 |
| 30 | 32.17 | 442 |
| 31 | 41.57 | 627 |
| 32 | 10.49 | 112 |
| 33 | 19.00 | 190 |
| 34 | 31.85 | 371 |
| 35 | 41.21 | 604 |
| 36 | 10.65 | 120 |
| 37 | 19.17 | 200 |
| 38 | 32.17 | 399 |
| 39 | 41.57 | 644 |

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A polyurea pavement marking composition comprising:
    (a) an isocyanate-containing component; and
    (b) an amine-containing component;
    wherein at least one of said components comprises plasticizer and at least one of said components comprises filler,
    wherein the polyurea pavement marking composition comprises about 5 wt. % or more plasticizer and is substantially free of polyaspartic ester amines,
    wherein the track-free time of the polyurea pavement marking composition is less than about 360 seconds, and wherein polyurea pavement marking composition has a Shore D hardness greater than 56 when fully cured.

2. The polyurea pavement marking composition of claim 1, wherein the plasticizer is a phthalate.

3. The polyurea pavement marking composition of claim 1, wherein the plasticizer is an alkylsulphonic acid phenyl ester.

4. The polyurea pavement marking composition of claim 1, wherein the plasticizer is phthalate-free.

5. The polyurea pavement marking composition of claim 1, wherein the composition comprises from about 5 to about 45 wt. % plasticizer.

6. The polyurea pavement marking composition of claim 5, wherein the composition comprises from about 10 to about 35 wt. % plasticizer.

7. The polyurea pavement marking composition of claim 5, wherein the filler is selected from the group consisting of talc, titanium dioxide, silica, zirconia, calcium carbonate, calcium magnesium carbonate, glass or ceramic microspheres and combinations thereof.

8. The polyurea pavement marking composition of claim 1, wherein the amine-containing component comprises a sterically hindered amine.

9. The polyurea pavement marking composition of claim 8, wherein the amine-containing component comprises polyoxyalkyleneamine.

10. The polyurea pavement marking composition of claim 1, wherein the isocyanate-containing component comprises one or more of isocyanurate groups, uretdione groups, biuret groups, and allophonate groups.

11. The polyurea pavement marking composition of claim 1, wherein the isocyanate-containing component comprises one or more of hexamethylene diisocyanate, cyclohexane diisocyanate, 1,12-dodecane diisocyanate, 1,4-tetramethylene diisocyanate, isophorone diisocyanate, dicyclomethane diisocyanate, m-phenylene diisocyanate, p-phenylene diisocyanate, polymethylene polyphenylisocyanate, tetraalkyl xylene diisocyanate, toluene diisocyanate, dianisidine diisocyanate, bitolylene diisocyanate, naphthalene-1,4-diisocyanate, diphenylene 4,4'-diisocyanate, xylylene-1,3-diisocyanate, bis(4-isocyanatophenyl)methane, bis(3-methyl-4-isocyanatophenyl)methane, 4,4'-diphenylpropane diisocyanate, polymeric forms thereof; and an active hydrogen containing material selected from at least one polyol, a high molecular weight polyoxyalkyleneamine or a combination thereof.

12. The polyurea pavement marking composition of claim 1, wherein the amine-containing component comprises

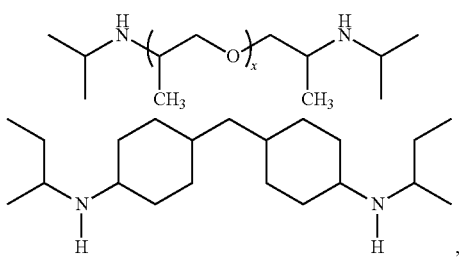

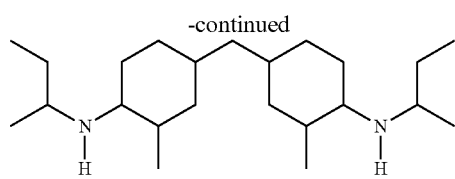

-continued

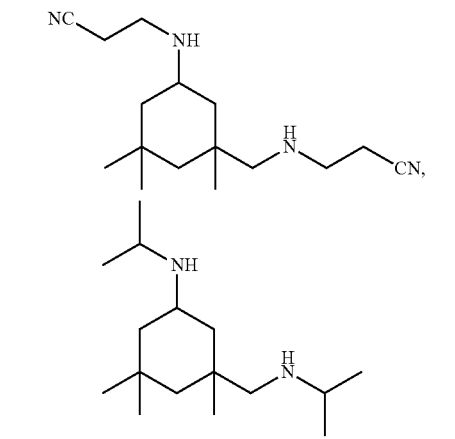

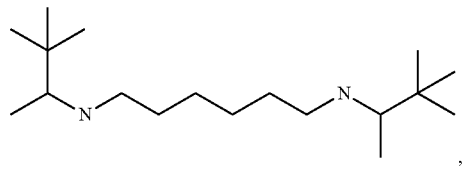

or combinations thereof.

13. The polyurea pavement marking composition of claim 1, wherein the volume ratio of the isocyanate-containing component to the amine-containing component is 1:X; wherein X is about 0.1 to about 10.

14. The polyurea pavement marking composition of claim 13, wherein X is about 2.

15. The pavement marking composition of claim 10, wherein the shrinkage of a pavement marking including the pavement marking composition is less than 1.5%.

16. The polyurea pavement marking composition of claim 10, wherein the cup cure speed of the composition is about 60 seconds or longer.

17. The polyurea pavement marking composition of claim 16 wherein the cup cure speed of the composition is from about 60 to about 3600 seconds.

18. A traffic bearing surface having thereon a pavement marking including the polyurea pavement marking composition of claim 1.

19. A pre-formed pavement marking comprising a substrate having thereon a coating of the polyurea pavement marking composition of claim 1.

* * * * *

UNITED STATES PATENT AND TRADEMARK OFFICE
CERTIFICATE OF CORRECTION

PATENT NO. : 9,797,097 B2
APPLICATION NO. : 14/404300
DATED : October 24, 2017
INVENTOR(S) : Alexander Kugel Page 1 of 1

It is certified that error appears in the above-identified patent and that said Letters Patent is hereby corrected as shown below:

In the Specification

Column 7
Line 59, Delete ""Vestanate" and insert -- "Vestanat --, therefor.

Column 8
Line 17, Delete "(DEEM)," and insert -- (DEHP), --, therefor.
Line 26, Delete "glycosate," and insert -- glycolate, --, therefor.
Line 29, Delete "(DIBP)," and insert -- (DIBP); --, therefor.
Line 38, Delete "diisonyl" and insert -- diisononyl --, therefor.
Line 42, Delete "glutamate," and insert -- glutarate, --, therefor.
Line 42, Delete "sebacates," and insert -- sebacate, --, therefor.
Line 62-63, Delete "monoglycerides:" and insert -- monoglycerides; --, therefor.

Column 9
Line 17, Delete "5.8" and insert -- 5, 8 --, therefor.

Column 13-14
Line 21 (Approx.), Delete "Inca," and insert -- Inc, --, therefor.

Signed and Sealed this
Twentieth Day of February, 2018

Andrei Iancu
*Director of the United States Patent and Trademark Office*